(12) United States Patent
Von Gerlach et al.

(10) Patent No.: US 6,708,113 B1
(45) Date of Patent: Mar. 16, 2004

(54) NAVIGATION METHOD FOR A MEANS OF TRANSPORT

(75) Inventors: Bjoern Von Gerlach, Rossdorf (DE); Joachim Wietzke, Karlsruhe (DE); Stefan Rychlak, Ilsede (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/048,739

(22) PCT Filed: Jul. 14, 2000

(86) PCT No.: PCT/DE00/02311
§ 371 (c)(1),
(2), (4) Date: May 3, 2002

(87) PCT Pub. No.: WO01/06479
PCT Pub. Date: Jan. 25, 2001

(30) Foreign Application Priority Data

Jul. 17, 1999 (DE) .......................... 199 33 638

(51) Int. Cl.⁷ .............................. G01C 21/00
(52) U.S. Cl. ...................................... 701/210
(58) Field of Search ................ 701/201, 209, 701/210, 211, 35; 340/995, 995.21, 995.23

(56) References Cited

U.S. PATENT DOCUMENTS 5,184,303 A * 2/1993 Link .......................... 701/210
5,243,528 A   9/1993 Lefebvre
6,256,579 B1 * 7/2001 Tanimoto .................... 701/201

FOREIGN PATENT DOCUMENTS

| DE | 197 53 172 A | 7/1998 |
| EP | 0 803 708 A | 10/1997 |
| EP | 0 921 509 A | 6/1999 |
| JP | 2000-088590 | * 3/2000 |

* cited by examiner

Primary Examiner—Michael J. Zanelli
(74) Attorney, Agent, or Firm—Michael J. Striker

(57) ABSTRACT

The present invention relates to a navigation method for a means of transportation, in particular for a vehicle, motor vehicle, ship or aircraft, for navigating from a starting point to a destination, in which a route from the starting point to the destination is specified and the means of transportation or its user is guided along this route. Upon departing from the specified route before reaching the destination, the course traveled at least until re-entering the specified route or reaching the destination is recorded, stored in memory, and upon a later request for a route with the same starting point and destination, the course stored in memory is proposed as the route or the applicable route segment that replaces an originally proposed route segment.

8 Claims, 1 Drawing Sheet

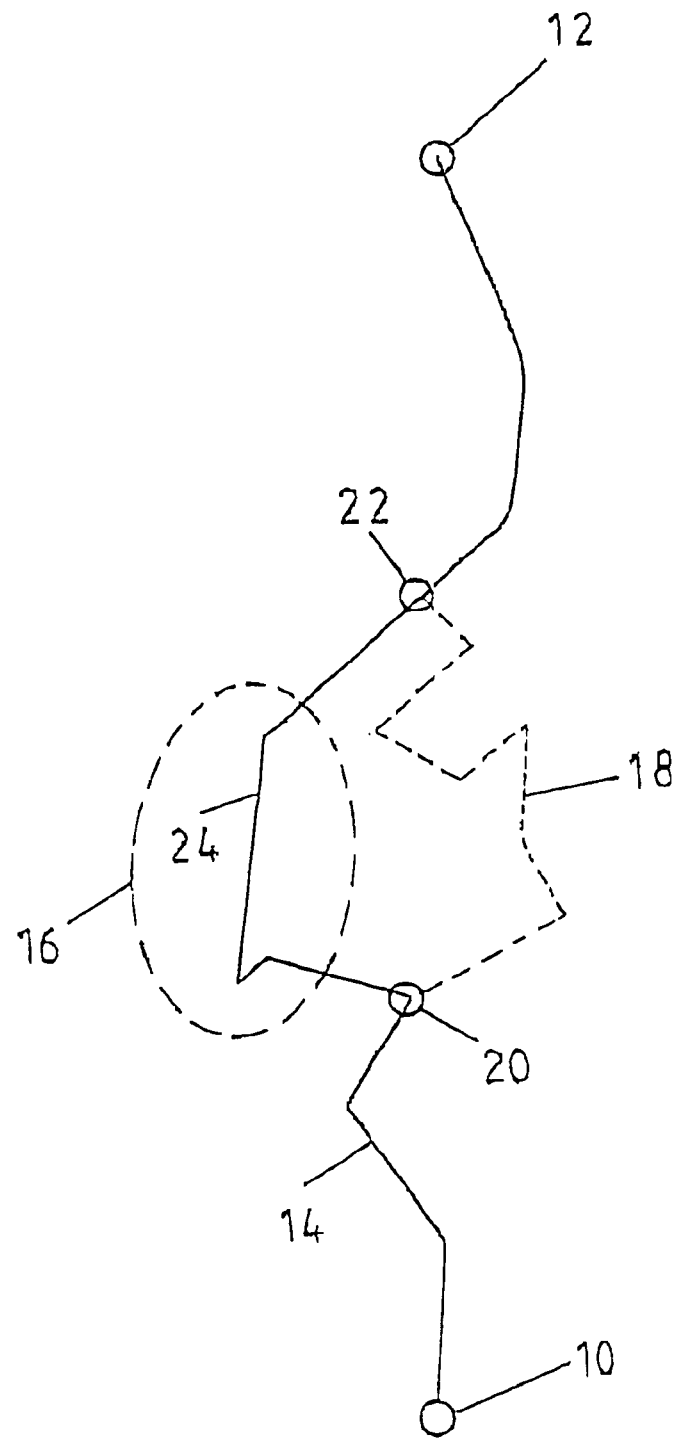
Fig.

NAVIGATION METHOD FOR A MEANS OF TRANSPORT

BACKGROUND OF THE INVENTION

The invention relates to a navigation method for a means of transportation, in particular for a vehicle, motor vehicle, ship or aircraft, for navigating from a starting point to a destination, in which a route from the starting point to the destination is specified and the means of transportation or its user is guided along this route.

Prior Art

Navigation systems permanently installed in means of transportation, such as motor vehicles, aircraft or ships, direct a driver or operator of the means of transportation quickly, simply and safely from a current location to a desired destination without the driver or operator of the means of transportation having to plan a route complicatedly in advance and acquire appropriate map material. To that end, navigation data based for instance on charts, geographic maps, or road maps, are available, stored on something like a digital map base, for instance on CD-ROM. The navigation device uses the Global Positioning System (GPS), for instance, to ascertain an instantaneous location and calculate appropriate navigation instructions that lead to the destination.

In navigating a motor vehicle through a network of roads or streets, for instance, reproduced by a digital map base stored in memory in the navigation system, it happens that a driver will select courses or legs that he prefers, for instance based on his particular knowledge of the location, that deviate from a route specified by the navigation system. This often happens with commuters, for instance, who take a regular route between where they live and where they work. Because such familiarity with places or regular routes is entirely unknown to conventional navigation systems, they keep trying to return the driver to the specified route by instructing him to do so. The driver finds this unpleasant and annoying, however.

Moreover, from conventional, self-sufficient navigation systems that calculate a route based solely on the digital map base, it is impossible to learn that in actuality such external factors as frequent unexpected high traffic density on certain legs at certain times of day result in average speeds different from those stored for that particular partial course in the digital map base. For instance, there may in fact be faster routes that the navigation system cannot find in the digital map base, because of its fixedly specified average speeds.

SUMMARY OF THE INVENTION

It is the object of the present invention to present an improved method of the above type which overcomes the aforementioned disadvantages.

To that end, according to the invention it is provided that upon departing from the specified route before reaching the destination, the course traveled at least until re-entering the specified route or reaching the destination is recorded, stored in memory, and upon a later request for a route with the same starting point and destination, the course stored in memory is proposed as the route or the applicable route segment that replaces an originally proposed route segment.

This has the advantage that a navigation system will accordingly learn so-called regular routes that the user or driver of the means of transportation is quite familiar with and prefers, such as courses commuters drive daily, and later immediately proposes them as a specified route or part of a specified route. At the same time, the navigation system optionally learns new roads or streets, if the driver chooses a course over roads or streets that are not yet stored in a digital map base of the navigation system.

Preferable refinements of the method are described in claims 2–6.

Expediently, upon departing from the specified route before reaching the destination, a user is asked to input a confirmation as to whether the course then traveled is a course to be stored in memory and proposed again later, or not. The system accordingly receives the information whether the departure is an intended or a mistake in deviation from the guided route.

Alternatively, upon departing from the specified route before reaching the destination, a user is asked to input a confirmation whether the course subsequently traveled is to be recorded, or not, and upon re-entering the specified route or reaching the destination, a user is asked to input a confirmation whether the recorded course is to be stored in memory as a preferred course, or not.

In a preferred embodiment, on driving again over a course stored in memory, the average speeds attained in each case are detected and stored in memory, and the average speeds stored in memory are averaged over a predetermined or user-specified period of time and compared with average speeds stored in memory in a digital map base for alternative routes or partial routes, and an alternative route or partial route is proposed if the memorized, averaged average speeds are less, by a predetermined or user-specifiable amount, for instance of 30%, than the average speeds stored in memory in the digital map base for an alternative route or partial route.

Also in a method of the above type, it is provided according to the invention that average speeds attained during the guidance along the route or along individual course segments are detected, stored in memory, and compared with average speeds stored in a digital map base for alternative routes or course segments, and upon a later request for a route with the same starting point and destination, an alternative route or course segment is proposed if a detected average speed for a route or course segment is less by a predetermined value than an average speed stored in the digital map base for the corresponding alternative route or course segment.

This has the advantage that by constant monitoring of current traffic situations while a route is being driven, the navigation system can tell for a future route calculation whether a value for the average speed to be expected that is stored in memory in the digital map base for the applicable route or leg is out of date or nonapplicable.

To illuminate incidental statistical deviations in various average speeds, the average speeds detected are averaged over a predetermined number of traversals of a route before a comparison with average speeds stored in the digital map base is made.

BRIEF DESCRIPTION OF THE DRAWINGS

The invention will be described in further detail below in conjunction with the drawing. In the sole FIGURE, a specified route is shown along with a regular route preferred by a driver as a deviation from the specified route.

DETAILED DESCRIPTION OF THE PREFERRED EMBODIMENTS

The sole drawing FIGURE illustrates the case, described at the outset, of route guidance from a starting point 10 to a destination 12; solid lines schematically indicate a route 14 specified by a navigation system on the basis of a digital map base. A circle 16 drawn in dashed lines represents a metropolitan area through which the specified route 14 leads. A driver who is especially familiar with the place and whose course from the starting point 10 to the destination 12 is his daily course to work, for instance, has meanwhile learned, for instance from long experience and by trying out different courses, that if he deviates from the specified route 14, he attains a higher average speed over an alternative leg 18 represented by dashed lines than over the specified route 14. This is because the leg 18 is for instance a "shortcut" familiar only to automobile drivers knowledgeable about the area and carrying little traffic, or because there are fewer traffic lights, or better-timed lights, along that leg 18.

Accordingly, in the course preferred by the driver, the route segment 24 is replaced by the alternative leg 18 between a first location 20, where the driver leaves the specified route 14, to a second location 22, where the driver returns to the specified route. It should be noted at this point that the drawing must be understood as merely an example. In an extreme case, the first location 20 can coincide with the starting point 10, and the second location 22 can coincide with the destination 12, so that then the driver discards the entire route 14 specified by the navigation system.

At the first location 20, the navigation system notes the deviation from the guided route. According to the invention, the driver is asked whether he wants the route subsequently traveled to be recorded. If so, then the navigation system has the information that the driver is intentionally deviating from guidance along the specified route 14 and for the time being does not attempt to return the driver to the specified route 14 by giving him directions for it. Instead, the navigation system records the alternative leg 18, which can also be courses that are not included as roads or streets in the digital map base. If the driver does lose his way, however, then by pressing a button he can re-activate the route guidance and is then guided back to the specified route 14 by the navigation system.

On reaching the second location 22, the navigation system asks whether the recorded leg 18 should be stored in memory as a leg to be proposed as an alternative. If the driver says yes, then in future, upon a request to specify a route from this starting point 10 to this destination 12, the route segment 24 is replaced by the alternative leg 18. Roads or streets of the alternative leg 18 that are not stored in the digital map base are recognized as such by the navigation system and are classified, on the basis of the average speed achieved, as inside city limits, country road, federal highway, or limited-access highway. As a result, according to the invention, the navigation system can "learn" additional new streets and roads.

On the next trips over the alternative leg 18, the navigation system then monitors the average speeds attained, if the driver wishes this. To that end, a "commuter" function is for instance provided in the navigation system, in which the driver must provide the following additional inputs:

| | |
|---|---|
| Limited-access highway: | 130 km/h |
| Federal highway: | 90 km/h |
| Inside city limits: | 50 km/h |
| Alternative route beyond: | −30% |
| Data detection in days: | 5 |

With the parameter "data detection in days", the driver defines the time period or the number of trips through the alternative leg 18 over which the detected average speeds are to be averaged. This largely compensates for statistical deviations from the actual attainable average speed. If a "0" is input, then only the instantaneously detected average speeds are used, without averaging, so that statistical deviations are not taken into account. At a value greater than "0", the navigation system has evaluated the incidence of traffic on the leg 18 by way of the value for the average speed and compares this value with the expected average speed on the route segment 24 in accordance with the data from the digital map base. If the average speed on the route segment 24 is less by a predetermined value than that on the alternative leg 18, then the next time the navigation system again suggests the original route 14 as the course from the starting point 10 to the destination 12. The predetermined value is determined by the driver by way of the parameter "alternative route beyond". In the above example, a return to the original route segment 24 is made when the average speed on the alternative leg 18 is 30% lower than the average speed to be expected on the route segment 24 in accordance with the data from the digital map base.

In one possible extension of the method of the invention, the driver activates the "record alternative leg" function at an arbitrary point on his own, preferably whenever the vehicle location is outside the digital map base, or in other words is on a street or road not included in the digital map base. The recording then begins as soon as the vehicle begins to move and ends for instance when a course known to the navigation system is reached, or the driver manually stops the recording. A road width tolerance is expediently chosen generously, to compensate for measurement variations. On the basis of the travel speed, a rough classification of the road segments is made into categories of limited-access highway, federal highway, country road, or city traffic. Optionally, hotels, restaurants, sights or the like can also be stored in memory. In an additionally "learning menu" that may be present, additional information, such as one-way streets, stops (places to stay overnight) and so forth are stored in memory.

In alternative embodiment of the invention, the driver does not deviate from the specified route 14. Instead, as the specified route 14 is driven, the navigation system ascertains the average speed attained on corresponding legs. This is optionally done over several days or several trips. Average speeds correspondingly averaged on this basis over the legs are compared with data on alternative routes from the digital map base. For instance, it can happen that the average speed ascertained in practice for the route segment 24 is lower than for the leg 18 considered as an alternative; then in future, this alternative partial course 18 will be taken into account in calculating a route from the starting point 10 to the destination 12. In repeated subsequent trips along this alternative leg 18, it is again monitored constantly for its average speed, and if applicable an even better course is found, or if the average speed attainable on the alternative leg 18 later drops permanently, for instance because of such external factors as altered light timing or more trips by more and more vehicles, once again preference is given either to a different leg or to the route segment

What is claimed is:

1. A navigation method for a means of transportation, in particular for a vehicle, motor vehicle, ship or aircraft, for navigating from a starting point to a destination, in which a route from the starting point to the destination is specified and the means of transportation or its user is guided along this route, characterized in that upon departing from the specified route before reaching the destination, the course traveled at least until re-entering the specified route or reaching the destination is recorded, stored in memory, and upon a later request for a route with the same starting point and destination, the course stored in memory is proposed as the route or the applicable route segment that replaces an originally proposed route segment.

2. The method of claim 1, characterized in that upon departing from the specified route before reaching the destination, a user is asked to input a confirmation as to whether the course then traveled is a course to be stored in memory and proposed again later, or not.

3. The method of claim 1, characterized in that upon departing from the specified route before reaching the destination, a user is asked to input a confirmation whether the course subsequently traveled is to be recorded, or not.

4. The method of claim 1, characterized in that upon re-entering the specified route or reaching the destination, a user is asked to input a confirmation whether the recorded course is to be stored in memory as a preferred course, or not.

5. The method of claim 1, characterized in that while driving or on driving again over a course stored in memory, the average speeds attained in each case are detected and stored in memory.

6. The method of claim 5, characterized in that the average speeds stored in memory are averaged over a predetermined or user-specified period of time and compared with average speeds stored in memory in a digital map base for alternative routes or partial routes, and an alternative route or partial route is proposed if the memorized and averaged average speeds are less, by a predetermined or user-specifiable amount than the average speeds stored in memory in the digital map base for an alternative route or partial route.

7. A navigation method for a means of transportation, in particular for a vehicle, motor vehicle, ship or aircraft, for navigating from a starting point to a destination, in which a route from the starting point to the destination is specified and the means of transportation or its user is guided along this route, characterized in that average speeds attained during the guidance along the route or along individual course segments are detected, stored in memory, and compared with average speeds stored in a digital map base for alternative routes or course segments, and upon a later request for a route with the same starting point and destination, an alternative route or course segment is proposed if a detected average speed for a route or course segment is less by a predetermined value than an average speed stored in the digital map base for the corresponding alternative route or course segment.

8. The method of claim 7, characterized in that the average speeds detected are averaged over a predetermined number of traversals of a route before a comparison with average speeds stored in the digital map base is made.

* * * * *